Feb. 15, 1949.   C. STADICK   2,461,782
SAW SETTING MACHINE
Filed May 8, 1946   3 Sheets-Sheet 3
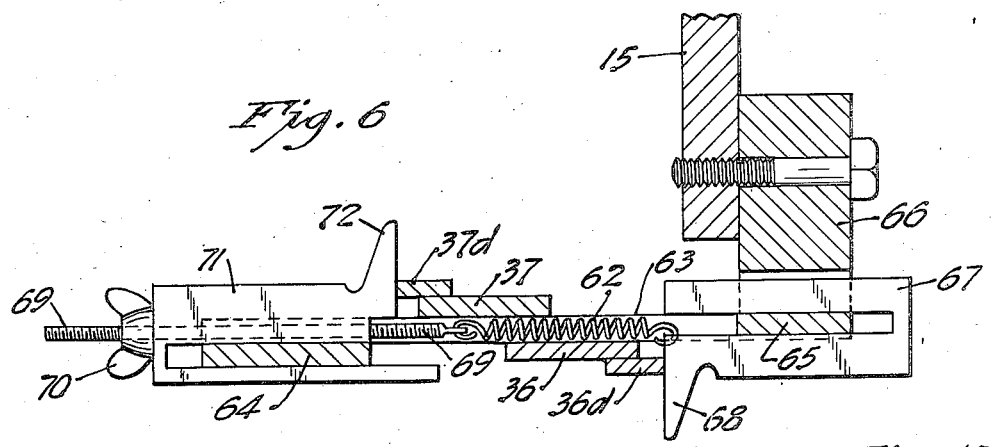
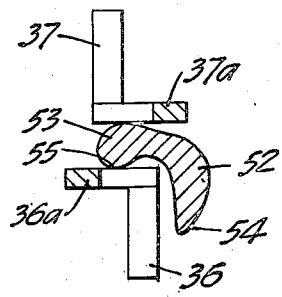
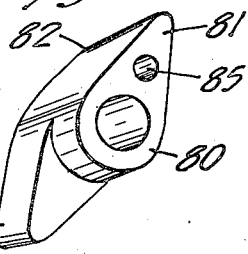
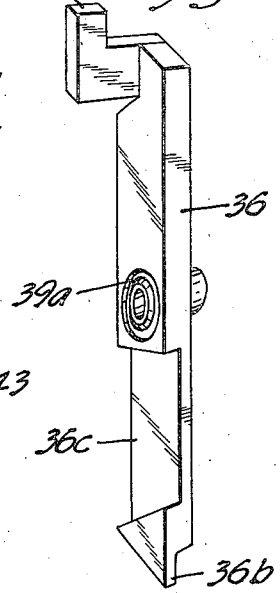
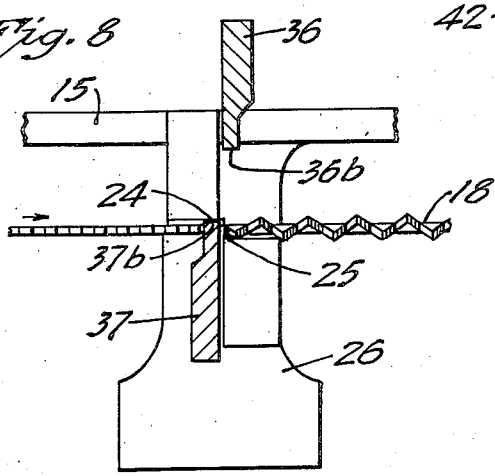
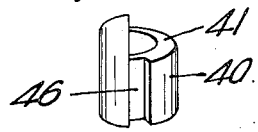
Inventor
Conrad Stadick
By John E. Stryker
Attorney Patented Feb. 15, 1949

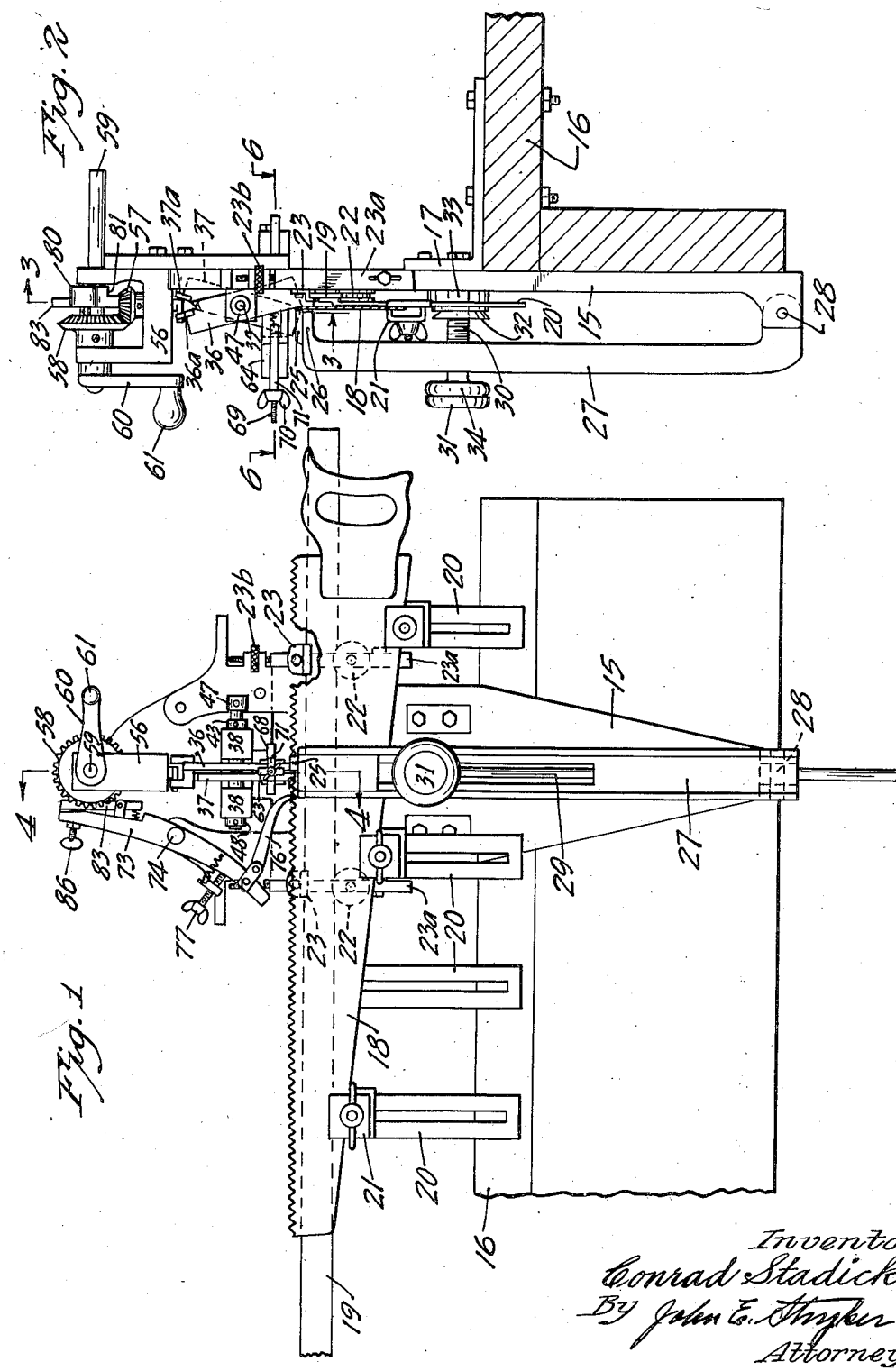

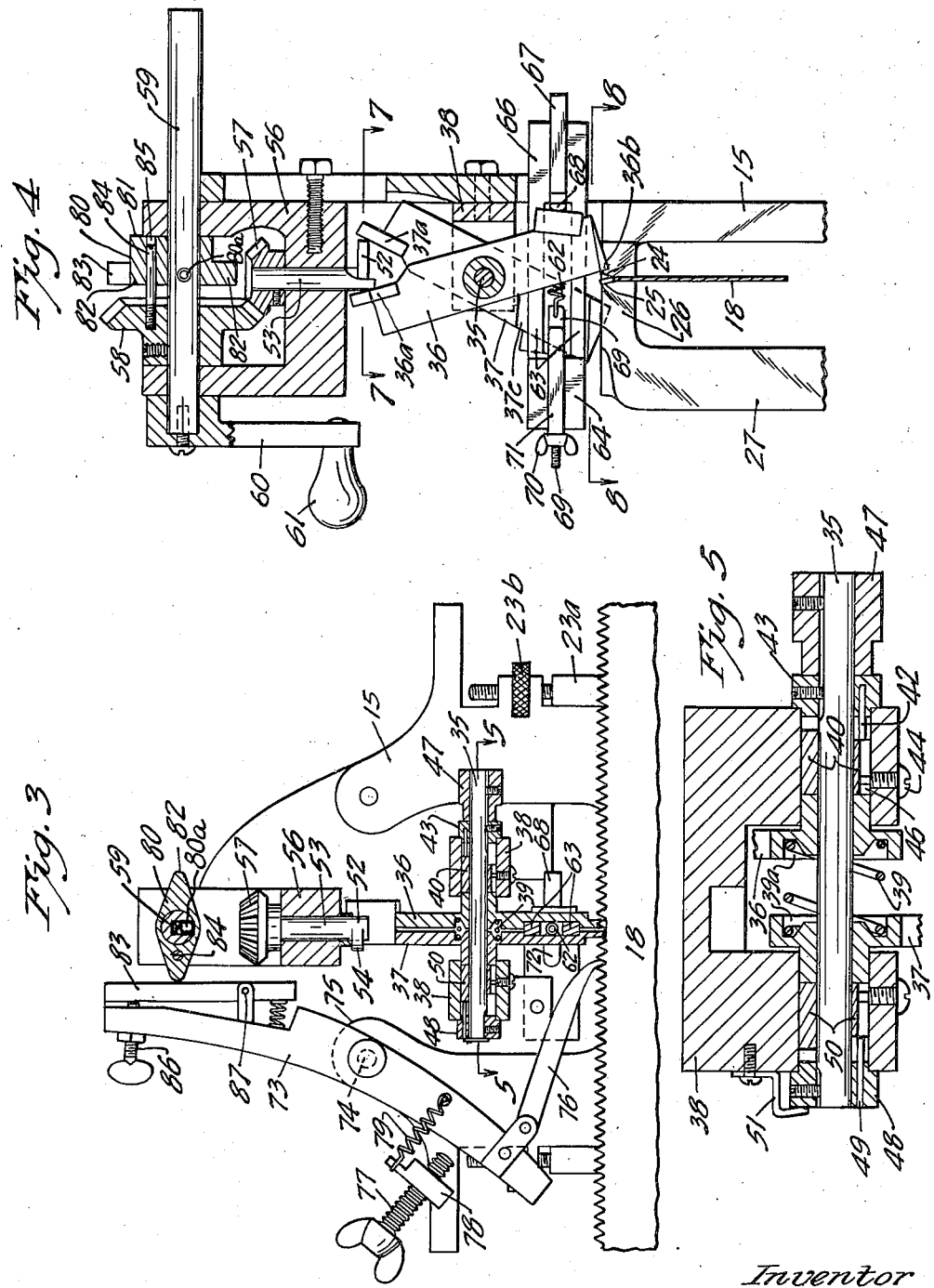

2,461,782

UNITED STATES PATENT OFFICE 2,461,782

SAW SETTING MACHINE

Conrad Stadick, Searles, Minn.

Application May 8, 1946, Serial No. 668,280

6 Claims. (Cl. 76—61)

It is an object of this invention to provide a novel, high speed machine for setting the teeth of saws.

A particular object is to provide a machine of this class with an improved arrangement of hammers and supporting and spacing mechanism therefor whereby precise adjustments of the machine to adapt it for setting teeth which are variously spaced may be made rapidly and easily.

A further object is to provide in a machine of this class hammer operating mechanism which is readily adjustable to vary the number of blows and force applied in each blow to each of the individual saw teeth and to thereby compensate for the resistance of any particular saw to setting.

Another object is to provide unusually compact and efficient saw tooth setting mechanism which is adapted for use with the saw carriers of a popular commercially available saw filing machine.

My invention also includes a number of other novel features of construction which facilitates both uniformly accurate setting of saw teeth and adjustments of the hammers to adapt them to set saws of various kinds including hand saws, band saws and circular saws, and having teeth of any of the common sizes ranging, for example, from three to sixteen points per inch.

In the accompanying drawings a preferred embodiment of my invention is illustrated by way of example and not for the purpose of limitation.

Referring to the drawings:

Figure 1 is a front elevational view of my machine with a hand saw in place on the carrier;

Fig. 2 is an end view of the machine with the saw shown in vertical section;

Fig. 3 is a fragmentary vertical section taken approximately on the line 3—3 of Fig. 2;

Fig. 4 is a fragmentary vertical section taken approximately on the line 4—4 of Fig. 1;

Fig. 5 is a fragmentary section taken on the line 5—5 of Fig. 3 but showing the hammers relatively widely spaced apart along the supporting shaft;

Fig. 6 is a fragmentary section taken on the line 6—6 of Fig. 2;

Fig. 7 is a fragmentary section taken on the line 7—7 of Fig. 4;

Fig. 8 is a fragmentary section taken on the line 8—8 of Fig. 4;

Fig. 9 is a perspective view of the saw feed cam;

Fig. 10 is a perspective view of one of the hammers;

Fig. 11 is a perspective view of one of the cam actuating members for the hammer spacing mechanism, and Fig. 12 is a perspective view of one of the hammer spacing cams.

My machine is provided with a main frame indicated generally by the numeral 15 which is adapted to be supported in upright position on a bench or other suitable support indicated at 16 in Figs. 1 and 2. A rigid angle bracket 17 is provided to fasten the frame 15 to the support 16.

Saw carrier

Mechanism similar to that employed in certain commercially available saw filing machines is provided for supporting saws of various types and sizes on the front of the frame 15. As shown, a hand saw 18 is mounted on a carrier comprising a horizontally extending bar 19 having rigid depending arms 20 carrying manually operable clamps 21 for engaging the saw near its lower edge. The clamps 21 are adjustable vertically on the arms 20 to accommodate saws of various widths, shapes and lengths. To support and guide the carrier bar 19, a pair of grooved wheels 22 are mounted on the frame 15 in downwardly spaced relation to guides 23. These wheels and guides are supported for vertical adjustment on member 23a suspended from threaded rods engaging knurled nuts 23b.

A saw on the carrier comprising the bar 19, arms 20 and associated clamps is moved horizontally along a determined path so that the saw teeth pass in front of and adjacent to an anvil member 24 formed on the frame 15. A second anvil member 25 is formed on a jaw member 26 and the latter is an integral part of a vertically extending bar 27 which has a pivotal connection 28 with the frame 15 near its lower extremity. A vertical slot 29 is formed in the arm 27 to slidably receive a screw 30 carrying a knob 31 at its front end and a conical head 32 at its rear end adapted to engage a circular saw (not shown) at the periphery of its arbor opening. The head 32 fits in an opposed ring 33 which affords an abutment for the back faces of the circular saws and is vertically adjustable relative to the frame 15 to revolubly support saws of various diameters in position to present the saw teeth between the anvil members 24 and 25. Threaded on the screw 30 near the front face of the arm 27 is a nut having a knob 34 adapted to be manipulated to oscillate the arm 27 to and from the saw.

Hammer mechanism

Extending horizontally in parallel relation to and directly above the toothed edge of the saw 18 is a shaft 35 supporting hammers indicated generally by the numerals 36 and 37 respectively. These hammers are adapted to coact respectively with the anvil members 25 and 24 in setting the saw teeth. The shaft 35 is supported in a substantially U-shaped bearing block 38 which is bolted to the frame 15 and the hammers are movable along the shaft between the parallel portions of the block 38 so that their adjoining faces may be brought together as indicated in Fig. 3 or widely separated as indicated in Fig. 5. A coiled spring 39 is arranged to urge the hammers 36 and 37 apart and has end portions which fit in annular recesses 39a in the respective hammers. Fitting on the shaft 35 and affording an end thrust abutment for the hammer 36 is a cam 40 having a spirally disposed end surface 41 in continuous engagement with a pin 42 (Figs. 5, 11 and 12) projecting from a head 43. This head is fixed on the shaft 35 by means of a suitable set screw and the cam 40 is held against rotation relative to the bearing block 38 supporting the shaft 35 by means of a set screw 44 which projects into a longitudinal groove 46 formed in the cam 40. A manually operable knob 47 is secured to an end portion of the shaft 35 and a head 48 similar to the head 43 is secured to the opposite end portion of this shaft. To actuate the hammer 37 along the shaft, a pin 49 projects from the head 48 and engages a cam 50 similar to the cam 40. A hub portion of the hammer 37 abuts against the cam 50. The cams 40 and 50 and their actuating pins 42 and 49 are enclosed within the bore of the bearing block 38 and are arranged to be actuated in opposite directions along the shaft 35 when the knob 47 and shaft 35 are turned. It will be evident that the spring 39 retains the spiral cam surfaces in continuous engagement with the ends of the pins 42 and 49 relative to the cam surfaces. A friction retarding device for holding the hammers in adjusted positions is shown in Fig. 5 and compresses a spring pressed detent 51 engaging the outer end surface of the head 48.

The hammers 36 and 37 extend obliquely upward from the shaft 35 and are formed with laterally projecting, rigid fingers 36a and 37a disposed to be actuated by a cam 52 mounted on the lower end of a vertical shaft 53. The cam 52 has a projection 54 of maximum radius, fo'lowed by a depressed surface of minimum radius, and a second projection 55 of intermediate radius which successively engage the fingers 36a and 37a to oscillate the hammers 36 and 37 through a predetermined arc and to afford a quick release of the hammers from their retracted positions. The shaft 53 is revoluble in a bearing bracket 56 mounted on the frame 15 and a beveled toothed pinion 57 is fixed on the upper end of this shaft to mesh with a bevel gear 58 mounted on a driving shaft 59. Fixed on the front end of the shaft 59 is a crank 60 having a manually operable handle 61.

As best shown in Figs. 8 and 10, the hammer 36 is formed at its lower end with a narrow striking face 36b adapted to coact with the anvil member 25 in setting alternate teeth of the saw laterally toward the front of the machine and the hammer 37 is provided with a similar striking face 37b to coact with the anvil member 24 to set the intermediate teeth laterally toward the rear. These hammers are spring biased toward striking position by a single spring 62 which extends substantially horizontally between them at an elevation intermediate their striking faces and shaft 35. Parallel guide bars 63 are vertically spaced to confine the spring 66 between them and to pass between the hammers 36 and 37, the latter being formed with recesses 36c and 37c to receive the bars 63 and spring 62. The guide bars 63 are connected together by members 64 and 65 (Fig. 6) and are also rigidly fastened at their rear ends to a block 66 which is bolted to the frame member 15. One end of the spring 62 is fastened to a horizontally extending U-shaped slide member 67 which is formed with a rigid finger 68 adapted to engage a lug 36d formed on the hammer 36. The opposite end of the spring 62 is fastened to the end of a rod 69, having a threaded end fitted with a wing nut 70 in engagement with a U-shaped slide member 71. This slide member fits between the bars 63, embraces the cross members 64 and is formed with a finger 72 projecting in engagement with a lug 37d formed on the hammer 37. The fingers 68 and 72 are long enough to permit the necessary separation of the hammers and to remain in operative engagement with the hammers as they are adjusted for setting teeth of various sizes. It will be evident that the spring 62 is utilized to actuate both hammers toward striking position. The tension of this spring is adjusted by turning the wing nut 70 on the threaded rod 69.

*Saw feeding mechanism*

Mechanism is provided for feeding saws step by step between the anvil members 24 and 25 and in operative relation to the hammers hereinbefore described. The feeding mechanism illustrated is similar to that employed in certain commercially available saw filing machines. As shown, it comprises a lever 73 adapted to oscillate on a pin 74 mounted on a frame member 75 and carrying a pawl 76 on its lower end portion for engagement with the saw teeth. A stop screw 77 is threaded in a frame member 78 to limit the rearward swinging movement of the lever 73 and this lever is biased to engage the screw 77 by means of a coiled spring 79.

To oscillate the lever 73 a cam indicated generally by the numeral 80 is mounted on the shaft 59. This cam is divided longitudinally of the shaft into two parts, one of which has a single projection 81 and the other of which has two projections 82 disposed diametrically opposite, one to the other. The cam 80 as a unit is slidable longitudinal'y of the shaft 59 to bring either of its parts into operative relation to a contact member 83 mounted on the lever 73. A driving connection between the shaft 59 and cam 80 is maintained in both positions of the cam by means of a pin 84 which is fixed on and projects from the face of the bevel gear 58 and fits loosely in a bore 85 (Fig. 9) formed in the cam 80 and extending parallel to the axis of the shaft 59. The cam 80 is held in adjusted position by means of a spring pressed friction ball 80a mounted in a recess in the shaft 59 and projecting therefrom to engage the cam.

A screw 86 is threaded in the upper end portion of the lever 73 and is adapted to be actuated to variously space the associated end portion of the contact member 83 from the lever thereby affording an adjustment for the forward feeding stroke of the pawl 76. The contact member 83 is pivotally supported on the lever 73 at 87 and is spring biased so that its upper end portion is retained in contact with the projecting end of the screw 86. By turning the screw 86 the limit of forward travel of the pawl 76 may be adjusted and by turning the stop screw 77 the backward limit may be corrected to adapt the feeding mechanism to properly feed saws having teeth variously spaced.

Operation

Any of the common hand saws may be mounted on the carrier comprising the bar 10 and pendant arms 20 upon which the clamps 21 are adjustable. These clamps are merely placed in engagement with the lower edge of the saw the teeth of which are to be set and are adjusted vertically to bring the teeth of the saw to the proper elevation corresponding to that of the anvil members 24 and 25 when the bar 19 is supported on the wheels 22. By adjustment of the knob 34 the spacing of the jaw member 26 relative to the saw blade may be changed to accommodate saws of various thicknesses and to guide them between the anvil members. The elevation of the supporting wheels 22 for the carrier bar 19 may also be adjusted when necessary by manipulation of the knurled nuts 23b.

When a circular saw is to be set the carrier bar 19 and its associated mechanism is not used but the knob 31 is actuated to withdraw the screw 30 and head 32 from the opposed ring 33. Thereupon the conical head 32 is inserted in the central openings in the saw and ring 33 and the elevation of the screw 30 relative to the jaw member 26 is adjusted to bring adjacent teeth at the upper periphery of the saw into setting relation to the anvil members 24 and 25. Finally the knobs 31 and 34 are adjusted to permit free rotation of the saw about the axis of the screw 30 while its upper periphery is guided between the jaw member 26 and frame 15.

After mounting a saw on the carrier or head 32, as described, the travel of the feed pawl 76 and lever 73 is adjusted so that the saw will be advanced step by step and with a forward stroke equal to twice the pitch or center to center spacing of the teeth. The forward stroke must also position a pair of teeth in operative relation to the anvil members 24 and 25 respectively. The screws 77 and 86 afford means for adjusting the feed stroke length and dwell position. The spacing of the hammers 36 and 37 along the shaft 35 is also adjusted to correspond to the spacing of the teeth of the particular saw to be set. This may be accomplished quickly and easily by manipulating the knob 47 to bring the striking faces 36b and 37b of the hammers into registry with adjacent saw teeth when the latter are in proper position with respect to the anvil members 24 and 25.

The setting of hand saw teeth is started with the teeth located at the right end of the saw as seen in Figs. 1, 3 and 8. Having properly located the saw in its carrier, or in the case of a circular saw in engagement with the supporting head 32 and ring 33, and having adjusted the stroke of the feeding mechanism and the spacing of the hammers for the particular saw to be set, the operator merely turns the crank 60 in a counterclockwise direction as seen in Fig. 1 to automatically feed the saw toward the right and to actuate the hammers to set the teeth rapidly and uniformly. As the shaft 59 turns counter-clockwise, the cam shaft 53 and cam 52 are rotated counterclockwise, as viewed from above. This causes the cam projection 54 to alternately retract the hammers 36 and 37 away from the saw teeth, against the action of the spring 62 and to alternately release the hammers so that their faces 36b and 37b strike the teeth and set them in the appropriate direction. Immediately after each setting stroke the cam projection 55 retracts the hammer striking face slightly from the set tooth and such face remains in spaced relation to the saw until the next setting stroke.

In the arrangement illustrated, the shaft 53 makes two revolutions for each revoluation of the shaft 59 and when the cam projections 82 are in operative relation to the saw feed lever 73 each saw tooth receives a single blow of a hammer during the dwell between forward strokes of the pawl 76. To increase the number of blows directed against each tooth it is only necessary to slide the cam 80 to the left as seen in Figs. 2 and 4 thereby bringing the cam part having a single projection 81 into operative relation to the feed lever 73. With this adjustment, the cam shaft 53 makes two revolutions for each feeding stroke of the pawl 76 thereby operating each of the hammers 36 and 37 twice during the dwell between feeding strokes. By this mechanism I adapt the machine to set the teeth of saws having varying resistance to setting.

It will be evident that the operation of my machine in the setting of the teeth of circular saws and band saws is in all essential respects like that hereinbefore described with reference to hand saws. Band saw carriers for commercial saw filing machines are well known and similar carriers may be used with the present machine to support and guide the toothed edge of a band saw in setting relation to the anvil members 24 and 25 and hammers 36 and 37. The band saw is merely supported on guide wheels so that a reach of the saw extends between the jaw members 26 and frame 10 and with the teeth at the proper elevation. The feed pawl 76 engages the teeth to advance the band saw step by step substantially as hereinbefore described with reference to circular saws and hand saws. With either type of saw my machine operates rapidly and efficiently to accurately set the teeth during a single passage of the saw through the machine.

Having described my invention, what I claim as new and desire to protect by Letters Patent is:

1. A saw setting machine comprising, means for supporting a saw to permit movement of its teeth along a determined path, anvil members disposed at opposite sides of said path, a shaft having its axis disposed in a plane common to the teeth of a saw carried by said supporting means and in outwardly spaced relation to the teeth, a pair of hammers pivotally mounted on said shaft and formed and disposed to coact with said anvil members respectively in setting the saw teeth, means for spacing said hammers variously along said shaft to set variously spaced saw teeth, a rigid arm projecting from each of said hammers, a cam positioned between said arms for actuating them and to alternately retract said hammers from the saw teeth and then release them, resilient means for actuating said hammers to strike the saw teeth when released by said cam and means for actuating said cam.

2. A saw setting machine comprising, means for supporting a saw to permit movement of its teeth along a determined path and with the teeth pointed upward, anvil members disposed at opposite sides of said path, a shaft having its axis disposed in a plane common to the teeth of a saw carried by said supporting means and in upwardly spaced relation to the teeth, a pair of hammers pivotally mounted on said shaft and formed and disposed to coact with said anvil members respectively in setting saw teeth, a rigid arm projecting upward from each of said hammers, a cam positioned between said arms for actuating them and to retract said hammers from the saw teeth, said cam having a single projecting member adapted to alternately actuate the arms of the respective hammers and release the same, resilient means for actuating said hammers to strike the saw teeth when released by said cam member and means for rotating said cam.

4. A saw setting machine comprising, means for supporting a saw to permit movement of its teeth along a determined path, anvil members disposed at opposite sides of said path, a shaft having its axis disposed in a plane common to the teeth of a saw carried by said supporting means and in outwardly spaced relation to the teeth, a pair of hammers pivotally mounted on said shaft and formed and disposed to coact with said anvil members respectively in setting the saw teeth, means for spacing said hammers variously along said shaft to set variously spaced saw teeth, a rigid arm projecting from each of said hammers, the outer ends of said arms being spaced apart, a cam positioned between the outer ends of said arms for actuating them to oscillate said hammers away from the saw teeth, said cam having a rigid projecting member adapted to alternately actuate the arms of the respective hammers and release the same, resilient means for actuating said hammers to strike the saw teeth, means for actuating said cam and means for feeding the saw, step by step, along said path in timed relation to the operation of said cam, said cam being actuated to cause each of said hammers to strike a tooth repeatedly between each of the successive feeding steps.

4. A saw setting machine comprising, means for moving saw teeth along a determined path, a shaft having its axis disposed in a common plane with said teeth and in spaced relation thereto, a pair of hammers pivotally mounted on said shaft to oscillate in planes perpendicular to the axis of said shaft and to strike the saw teeth, said hammers being relatively movable along said shaft and means for holding said hammers in variously spaced relation to each other on said shaft to set variously spaced saw teeth comprising, a cam member movable along and operatively connected to said shaft and engaging one of said hammers to move it along said shaft relative to the other hammer and means for turning said shaft to actuate said cam member, said hammers being free to oscillate on said shaft independently of said cam member.

5. A saw setting machine comprising, means for moving saw teeth along a determined path, a shaft having its axis disposed in a common plane with said teeth and in spaced relation thereto, a pair of hammers pivotally mounted on said shaft to oscillate in planes perpendicular to the axis of said shaft and to strike the saw teeth, said hammers being relatively movable along said shaft and means for holding said hammers in variously spaced relation to each other on said shaft to set variously spaced saw teeth comprising, cam members movable along and operatively connected to said shaft and engaging said hammers respectively, means for turning said shaft to actuate said cam members and means for retaining said hammers in engagement with said cam members.

6. A saw setting machine comprising, means for moving saw teeth along a determined path, a shaft having its axis disposed in a common plane with said teeth and in spaced relation thereto, a pair of hammers pivotally mounted on said shaft to oscillate in planes perpendicular to the axis of said shaft and to strike the saw teeth, said hammers being relatively movable along said shaft and means for holding said hammers in variously spaced relation to each other on said shaft to set variously spaced saw teeth comprising, a cam member slidable along said shaft and held against rotation, a second cam member fixed on said shaft and engaging said first mentioned cam member to actuate it along said shaft and means for retaining one of said hammers in engagement with said first mentioned cam member whereby the spacing of said hammers may be adjusted by turning said shaft about its axis.

CONRAD STADICK.

REFERENCES CITED

The following references are of record in the file of this patent:

UNITED STATES PATENTS

| Number | Name | Date |
|---|---|---|
| 295,115 | Detrick et al. | Mar. 11, 1884 |
| 338,161 | Bugbee et al. | Mar. 16, 1886 |
| 396,823 | Logan | Jan. 29, 1889 |
| 579,220 | Chellieu | Mar. 23, 1897 |
| 600,717 | Garabrant | Mar. 15, 1898 |
| 620,856 | Sicotte | Mar. 7, 1899 |
| 693,970 | Houf | Feb. 25, 1902 |
| 853,747 | Strombom | May 14, 1907 |

FOREIGN PATENTS

| Number | Country | Date |
|---|---|---|
| 325,987 | Italy | Apr. 22, 1935 |